United States Patent [19]

Carpentier

[11] Patent Number: 4,945,949
[45] Date of Patent: Aug. 7, 1990

[54] REDUCE HEIGHT DUST VALVE

[75] Inventor: Urgel R. Carpentier, Plattsburgh, N.Y.

[73] Assignee: Plattco Corporation, Plattsburgh, N.Y.

[21] Appl. No.: 449,070

[22] Filed: Dec. 18, 1989

Related U.S. Application Data

[63] Continuation of Ser. No. 323,103, Jan. 23, 1989, abandoned, and a continuation of Ser. No. 154,511, Feb. 5, 1988, abandoned, which is a continuation of Ser. No. 45,806, Apr. 10, 1987, abandoned, which is a continuation of Ser. No. 868,764, May 30, 1986, abandoned.

[51] Int. Cl.⁵ .............................................. F16K 1/00
[52] U.S. Cl. ...................................... 137/613; 251/56; 251/58; 251/228
[58] Field of Search ................... 251/56, 58, 228, 298, 251/243; 137/613

[56] References Cited

U.S. PATENT DOCUMENTS

| | | | |
|---|---|---|---|
| 2,833,511 | 5/1958 | Fletcher | 251/298 |
| 3,257,045 | 6/1966 | Carpentier | 251/360 |
| 3,916,949 | 11/1975 | Armstrong | 251/298 |
| 4,308,894 | 1/1982 | Carpentier | 137/630.15 |
| 4,480,812 | 11/1984 | Carpentier | 251/298 |
| 4,498,492 | 2/1985 | Carpentier | 137/613 |
| 4,547,099 | 10/1985 | Alexandrov et al. | 251/298 |

Primary Examiner—A. Michael Chambers
Attorney, Agent, or Firm—Lowe, Price, LeBlanc, Becker & Shur

[57] ABSTRACT

A dust trap comprising a pair of coaxially mounted dust valves. Each valve has a valve seat and flapper plate and actuator shaft which coacts with the flapper plate to cause it to initially slide and then pivot as the valve opens.

2 Claims, 3 Drawing Sheets

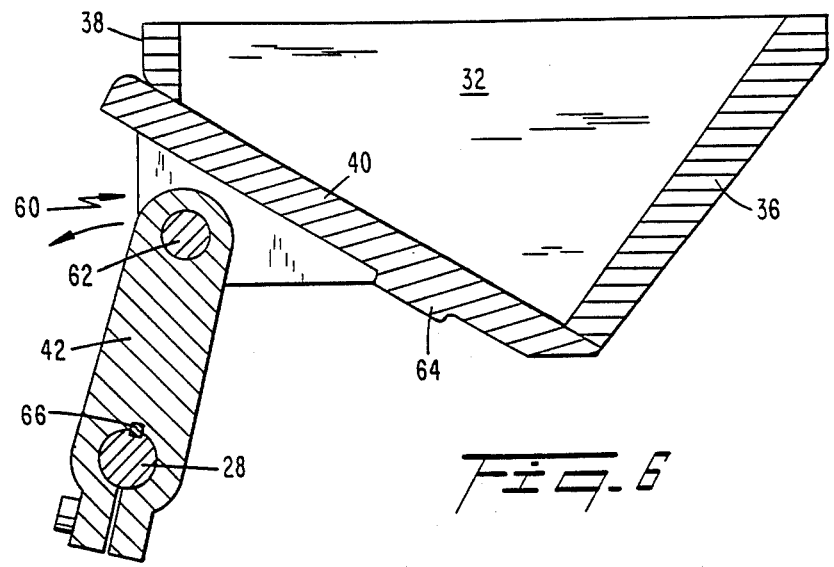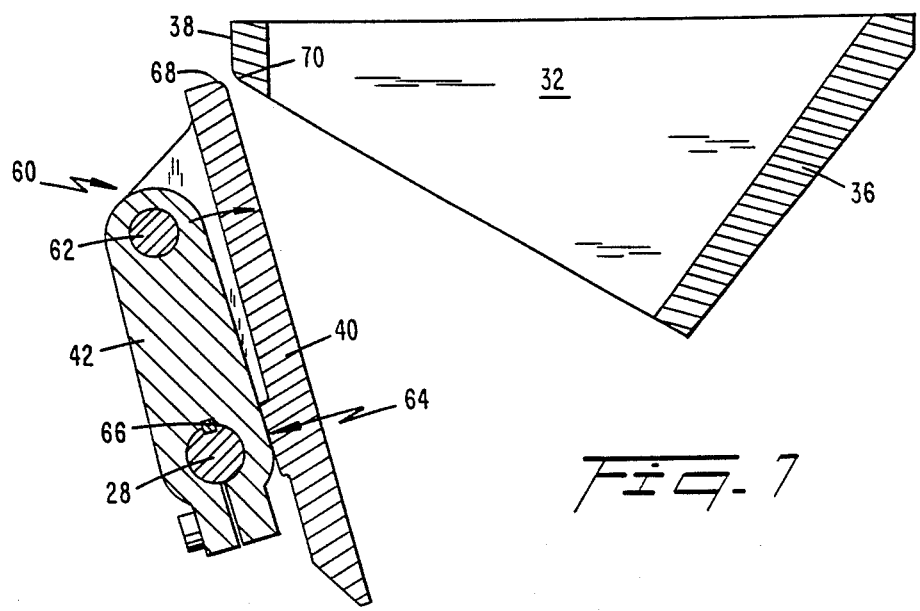

REDUCE HEIGHT DUST VALVE

This application is a continuation of Application Ser. No. 07/323,103, filed Jan. 23, 1989 now abandoned and a continuation of Application Ser. No. 154,511, filed Feb. 5, 1988 now abandoned which is a continuation of application Ser. No. 045,806, filed Apr. 10, 1987 now abandoned which is a continuation of Application Ser. No. 868,764, filed May 30, 1986 now abandoned.

This invention relates to a dust valve system and more particularly to a double dump airlock valve having a reduced headroom requirement.

Double dump airlock valves have been known for many years, and find wide applications in for example mining, milling, processing, waste disposal and waste incineration operations. The valves are typically used in a vacuum and pressure system to remove particulate material and thereby protect a collection system such as a bag house or the like. U.S. Pat. Nos. 3,257,045 and the improvement thereon No. 3,410,422, assigned to the assignee of this invention, describe typical prior art dust valve systems.

In order to maintain either a positive or negative pressurized system the valves are utilized in pairs. Particulate material will collect in the upper valve. The lower valve is initially closed when the upper valve is opened to dump the collated material onto the lower valve. The upper valve is then closed and the lower valve opened to remove the material from the system without effecting the pressure in the collection system. Flap valves are particularly well suited when the material is abrasive, at an increased temperature, or as noted above when the valve must function as an airlock. Maintainance costs of systems using such valves then are reduced because the particulate material is removed from the collection system before damage can be done to fans, cyclones, precipirtators, duct work, piping and the like.

Prior art flap valves however have a major disadvantage. The valve height requires excessive headroom. Typically, a valve having an 8 inch opening would have a height of from 21 to 32 inches. In many cases then, flap valves cannot be used because of this headroom requirement. In some cases, rotary valves can be substituted for flap valves because rotary valves, for an 8 inch opening, range in height from 12 to 19 inches. There are, however, certain applications as noted above in which the best performance can be achieved with a flap valve.

In addition, when the valve system is used in an airlock in for example, a vacuum conveyor system considerable torque may be required in order to open the valve flapper. This problem was addressed in U.S. Pat. No. 4,480,812, also assigned to the assignee of this application. In that patent, an off center mounting was used to crack one edge of the flapper away from the seat initially before the entire flapper rotated away from the seat. Similarly, in U.S. Pat. No. 4,308,894, the flapper included a separate pressure release valve.

However, it has been discovered that the sliding action typical of a gate valve can be combined in a flap valve design to release the pressure upon opening but provide the positive closure of a flap valve. In addition, it has been discovered that these features can be combined in a short valve wherein in an 8 inch opening, the double dump valve system is only half the height of standard flap valves. The sliding action upon opening of the flap also reduces the torque required, and the sliding action upon closing tends to flush any abrasive material from the valve seat so that an airtight closure results.

In the valve of this invention the actuating shaft is mounted at the bottom of the valve body instead of the top as is standard in prior art valves. A link or arm connects between the actuating shaft and the flapper and is mounted substantially off center on the flapper. The edge of the flapper plate and the corresponding edge of the seat adjacent the off center connection further define radiuses for pivotal movement against each other.

Accordingly, the flapper plate of the invention opens by initially sliding and then pivoting at the radial surfaces as the plate swings open until a spacer lug on the underside thereof encounters the actuating arm. This then breaks the vacuum requiring less power or torque, and similarly, when the plate swings open tends to jar loose compacted particulate material therein. Upon closing, the action is reversed, and the wiping of the machined surface of the seat as the flapper plate closes tends to flush interfacing particles or debris from the seat to achieve a fully aligned seal.

The valve of this invention then achieves a shortened height through the pivoting action of a surface of the plate against a surface of the seat whereby the height required is essentially the length or diameter of the flapper plate itself. Therefore in an 8 inch opening the height of a double dump valve of this invention is only 16 inches.

Accordingly it is an object of this invention to provide an airlock flap valve with substantially reduced headroom requirements.

It is another object of this invention to provide an airlock flap valve which opens and closes with a sliding action whereby less torque is required to open the valve.

It is another object of this invention to provide a flapper valve with an offsetting arm connected to an actuating shaft whereby when the flapper opens or closes an edge thereof pivots about a corresponding edge on the seat.

It is yet another object of this invention to provide a double dump valve system for an airlock when the height thereof is essentially the length of the flapper plates and wherein each flapper opens and closes with a sliding movement across the seat followed by or preceeded by a pivotal action of one edge of the flapper plate against the corresponding edge of the flapper seat.

These and other objects will become readily apparent with reference to the drawings and following description wherein:

FIG. 6 is a fragmentary cross-sectional view illustrating the actuator arm and flapper plate in a closed position FIG. 7 is a view similar to FIG. 6 showing the flapper plate in the open position.

Figure 1:
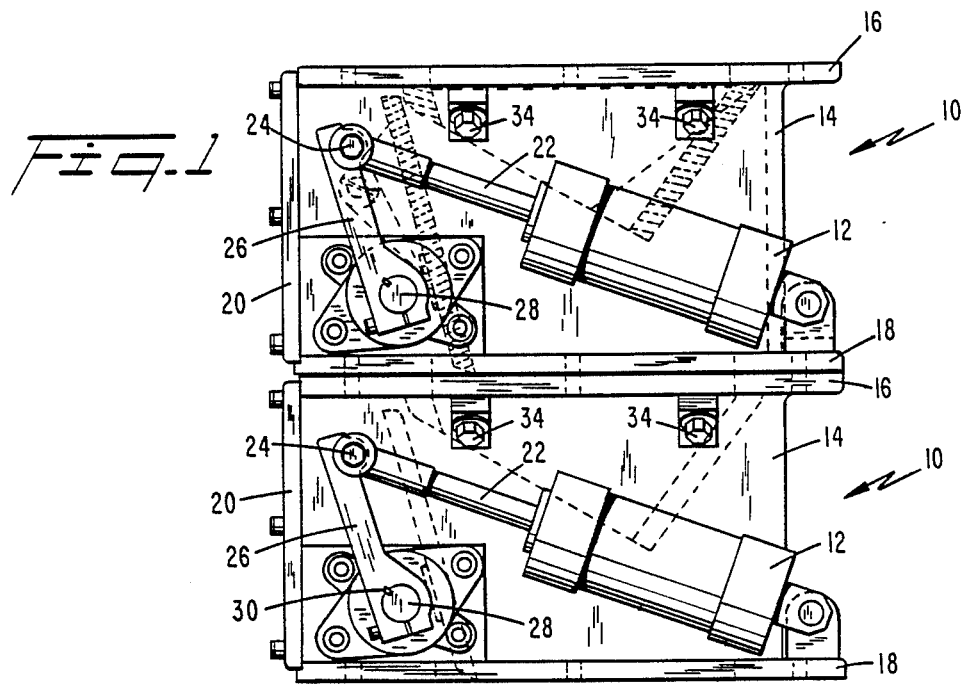
FIG. 1 is a side view of a double dump valve system of this invention showing the flapper and seat in phantom.
Figure 2:
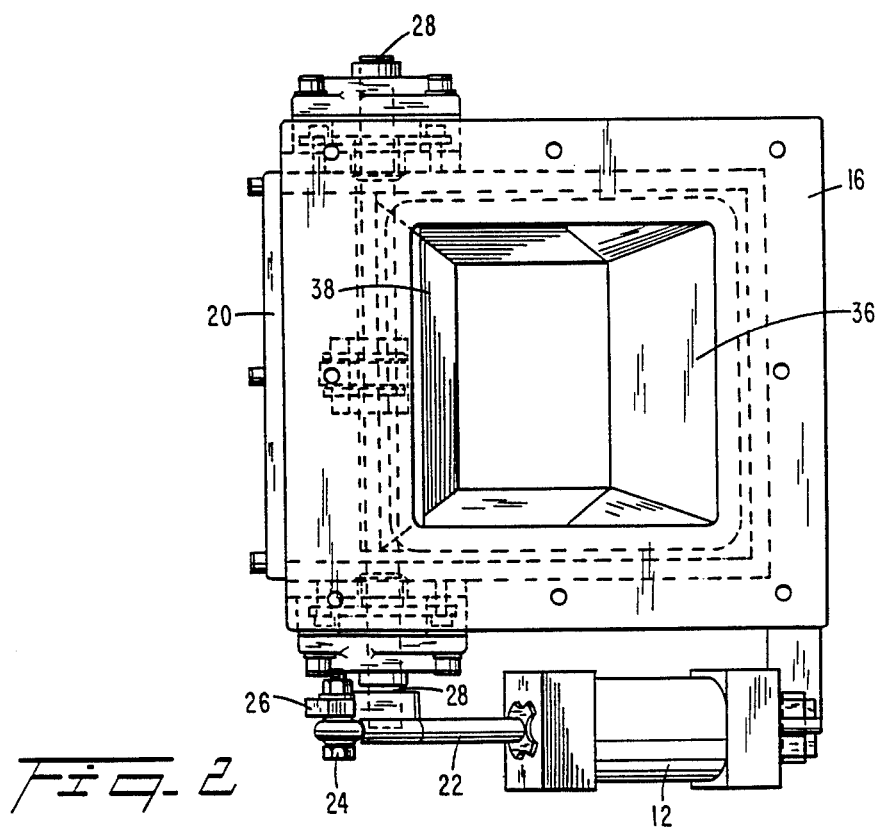
FIG. 2 is a top view of the device of FIG. 1.
Figure 3:
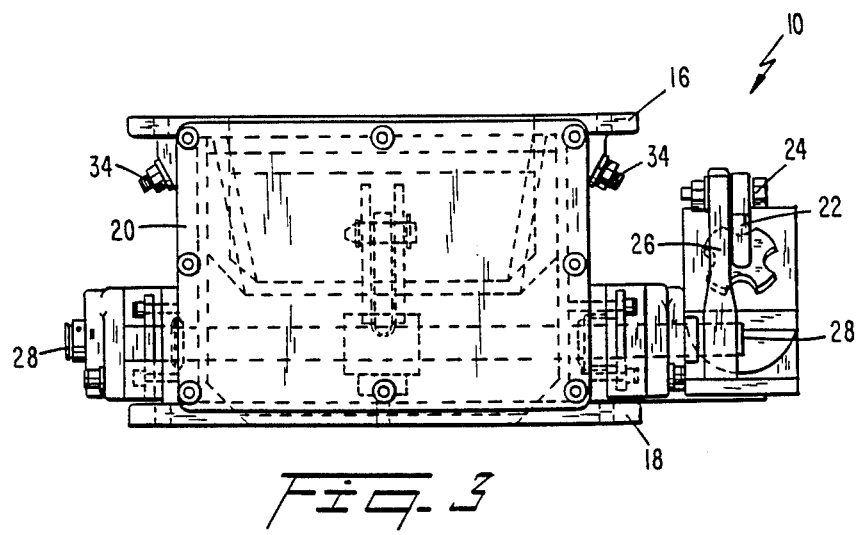
FIG. 3 is a front view of the device of FIG. 1 with one of the valves removed
Figure 4:
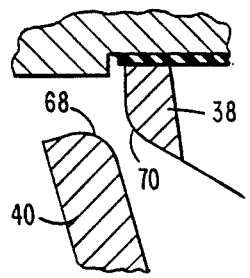
FIG. 4 is a fragmentary cross-sectional view showing the radial surfaces of the flapper and seat.
Figure 5:
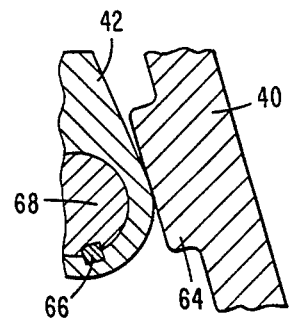
FIG. 5 is a fragmentary cross sectional view illustrating the spacer lug on the underside of the flapper plate.

With attention to the drawings and to FIGS. 1-3 in particular, as shown in FIG. 1, the valves 10 of this invention are normally stacked and bolted together. In an airlock situation, as will be subsequently explained, the opening and closing of the valves by pistons 12 are cycled. While the means for opening and closing the valve shown is a piston 12 this invention is not intended to be limited to a hydraulic or pneumatic means for opening and closing the valves. A motor could be utilized, or an electrical means, or in fact, the valves could be opened and closed manually.

The valve 10 generally consists of a valve body 14 which defines a passage therethrough and includes upper and lower mounting flanges 16 and 18. An access door 20 is provided on a side thereof for inspection and replacement of any worn internal parts.

The connecting rod 22 from piston 12 is pivotally attached at pin 24 to an end of link 26. The opposite end of link 26 is mounted on actuator shaft 28. Actuator shaft 28 is mounted on the lower portion of valve body 10 as shown in the drawings Conventionally, such shafts were mounted in the upper portion of the valve body. However, it has been discovered that by mounting the actuator shaft 28 in the lower portion of the valve body 10 the valve flapper plate can be linked thereto for a sliding movement in addition to pivotal movement as will be subsequently explained As will be obvious to those skilled in the art link 26 is rigidly attached to shaft 28 using, as shown in FIG. 1, a key 30.

With further attention to FIGS. 6 and 7, internally, a seat 32 is mounted within valve body 10 and secured for example by bolts 34 (FIG. 1). Seat 32 then may be removed through access 20 for regrinding or replacement.

Seat 32 has an elongated right wall 36 and a shortened left wall 38. A flapper plate 40 seats against the machined lower surface of seat 32 as shown in FIG. 6 when the valve is in the closed position. Flapper plate 40 is pivotally attached to an actuator arm 42 preferrably by a wrist and pin assembly 60 whereby plate 40 is pivotally mounted on arm 42 by pin 62. The underside of plate 40 mounts a space lug 64 which seats against arm 42 when the valve is in the open position shown in FIG. 7.

Arm 42 is then rigidly attached to actuator shaft 28 by for example key 66 and clamped cap screw.

Flapper plate 40 has a rear radial surface 68 and the rear portion 38 of seat 32 similarly has a radial surface 70.

As actuator shaft 28 rotates counterclockwise from the position shown in FIG. 6, flapper plate 40 initially slides toward rear wall 38, and then pivots to the position of FIG. 7. To close the valve, the procedure is reversed, and the pivotal movement puts radial surfaces 68 and 70 into contact. Clockwise rotation of shaft 28 from the position of FIG. 7 will cause the flapper plate 40, at its edge 68, to pivot against the corresponding edge 70 of seat 32 until arm 42 passes the vertical. The plate 40 will then slide forwardly to seat plate 40 on seat 32 as shown in FIG. 6.

As will be obvious, removal of access door 20 will provide full access to flapper plate 40 for inspection, or removal and replacement.

In operation, valves 10 would be stacked as shown in FIG. 1. The upper flange 16 of the upper valve 10 would then be bolted to a vacuum line of pressure (not shown). Both valves would be in the closed position of FIG. 6 wherein flapper plate 40 is seated against seat 32. When particulate material accumulates in the upper valve, the upper valve is opened to dump the material onto the closed lower valve. The upper valve is then closed and the lower valve opened in order to dump the material. The two valves together then function as an airlock.

Normally prior art valves as noted above required much more headroom to accomodate the swing of the flapper plate and its actuating arm, especially when the actuator shaft was disposed in the upper portion of the valve body. In the instant case however flapper 40 pivots about pin 62 and surfaces 68 and 70 pivot about each other so that in the open position flapper 40 essentially overlaps actuator arm 42. In this fashion, the headroom required is essentially the height of the flapper plate 40 itself. Therefore, the dust valve of this invention is essentially one half the height of prior art dust valves, and requires a headroom approximately equivalent to a rotary valve. In addition, the sliding action enclosure permits the flapper plate to flush any accumulated particulate material from the machine surface of the seat 32 to ensure a tight seal.

The invention may be embodied in other specific forms without departing from the spirit or essential characteristics thereto. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A dust trap comprising a pair of dust valves coaxially mounted to each other, each valve comprising; a valve body having a longitudinal flow path therethrough;

a conduit member removably mounted in the upper portion of said valve body surrounding the flow path and forming a valve seat contained in a plane disposed at an acute angle to the longitudinal axis of said valve body said seat being a rectangle having upper and lower ends and angular sides said upper end being disposed adjacent the side of said valve body where said shaft is mounted;

a valve flapper;

an actuator shaft rotatably mounted on and extending through the lower portion of said body adjacent a side thereof and means coupled thereto for rotating said shaft about 90 degrees;

an actuator arm affixed to said shaft and a valve flapper plate pivotally mounted on the end of said arm opposite said shaft, said arm being disposed to seat and unseat the upper surface of said flapper plate against said valve seat to open and close said valve as said shaft rotates the upper end surface of said seat and the corresponding surface of said flapper plate defining opposed radial surfaces said actuator arm being pivotally mounted on said flapper plate adjacent the end thereof which defines the radial surface whereby as said valve opens the radial surface said flapper plate will pivot against the radial surface of said seat and the opposite end will rotate downwardly to lie against said arm.

2. The valve of claim 1 wherein said arm is moveable between a position where the flapper plate is seated on said seat and said arm lies in a plane disposed at an acute angle to the vertical axis of the valve and a position when the valve is open wherein said shaft rotates and said plate is drawn across said seat until said arm is substantially vertical, said plate will pivot downwardly against the radial surface of said seat said positions being reversed when said shaft rotates to close said valve.

* * * * *